(12) United States Patent
Yasuda et al.

(10) Patent No.: US 9,715,046 B2
(45) Date of Patent: Jul. 25, 2017

(54) LENS ARRAY, AND METHOD FOR MANUFACTURING THE SAME

(71) Applicant: FUJI XEROX CO., LTD., Tokyo (JP)

(72) Inventors: Shin Yasuda, Kanagawa (JP); Keishi Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 128 days.

(21) Appl. No.: 14/281,081

(22) Filed: May 19, 2014

(65) Prior Publication Data

US 2015/0116836 A1    Apr. 30, 2015

(30) Foreign Application Priority Data

Oct. 24, 2013   (JP) .................................. 2013-220822

(51) Int. Cl.
| G02B 3/00 | (2006.01) |
| G02B 1/04 | (2006.01) |
| B29D 11/00 | (2006.01) |
| B29K 101/12 | (2006.01) |
| B29K 105/00 | (2006.01) |

(52) U.S. Cl.
CPC ...... *G02B 3/0031* (2013.01); *B29D 11/00298* (2013.01); *G02B 1/041* (2013.01); *G02B 3/0025* (2013.01); *G02B 3/0056* (2013.01); *B29K 2101/12* (2013.01); *B29K 2105/0058* (2013.01); *B29K 2105/0067* (2013.01)

(58) Field of Classification Search
CPC .......... B29D 11/00298; B29K 2101/12; B29K 2105/0058; B29K 2105/0067; G02B 1/041; G02B 3/0025; G02B 3/0031; G02B 3/0056

USPC .................................................. 359/619–628
See application file for complete search history.

(56) References Cited

U.S. PATENT DOCUMENTS

| 7,328,638 | B2* | 2/2008 | Gardiner ................. B23B 27/20 82/123 |
| 2005/0025423 | A1* | 2/2005 | Hanaoka .................. G02B 1/11 385/37 |
| 2006/0262393 | A1* | 11/2006 | Toyoda ............ B29D 11/00278 359/456 |

(Continued)

FOREIGN PATENT DOCUMENTS

| JP | 2010-235425 A | 10/2010 |
| JP | A-2011-011785 | 1/2011 |

(Continued)

OTHER PUBLICATIONS

Sep. 5, 2016 Office Action issued in Chinese Patent Application No. 201410323296.0.

(Continued)

*Primary Examiner* — Thomas K Pham
*Assistant Examiner* — Vipin Patel
(74) *Attorney, Agent, or Firm* — Oliff PLC

(57) ABSTRACT

Provided is a lens array, wherein partition walls are formed, using a blade, on a surface of a liquid-repellent substrate subjected to a lyophilic surface treatment, liquid-repellent groove sections formed by the blade, each of the liquid-repellent groove sections is V-shaped, lyophilic sections between the partition walls that are adjacent each other, and lenses are formed on the lyophilic sections using a liquid polymer.

5 Claims, 7 Drawing Sheets

(56) References Cited

U.S. PATENT DOCUMENTS

2010/0149450 A1* 6/2010 Okumura ......... B29D 11/00365
349/57
2013/0149404 A1* 6/2013 Yasuda ............... B29C 47/0021
425/150

FOREIGN PATENT DOCUMENTS

JP   A-2013-125044       6/2013
WO   2012/157644 A1   11/2012

OTHER PUBLICATIONS

Dec. 20, 2016 Office Action issued in Japanese Patent Application No. 2013-220822.

* cited by examiner

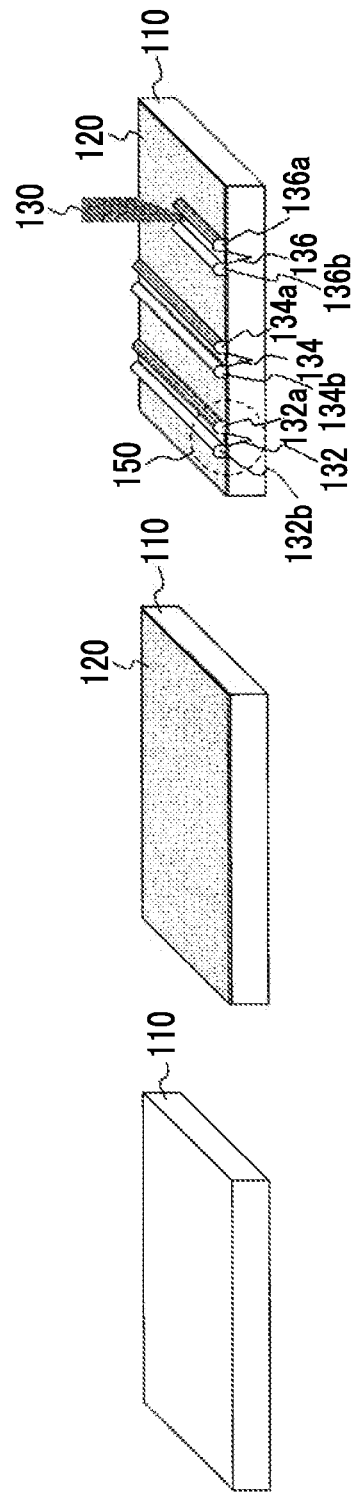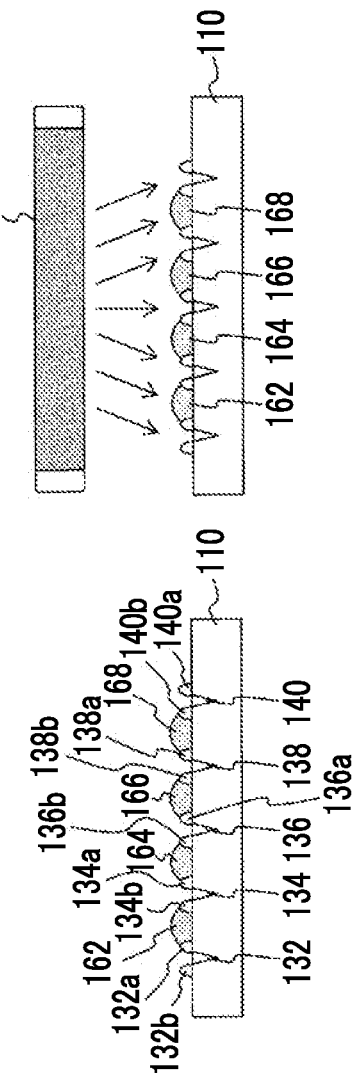

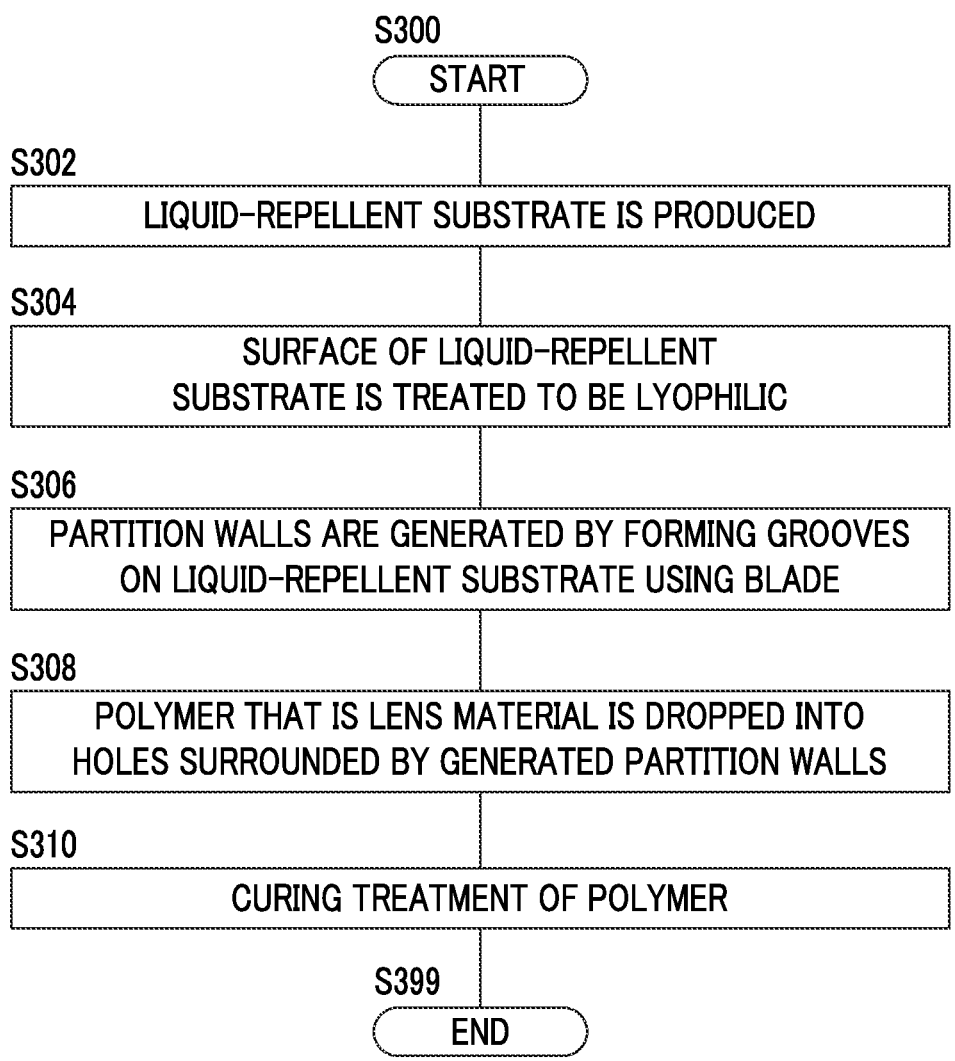

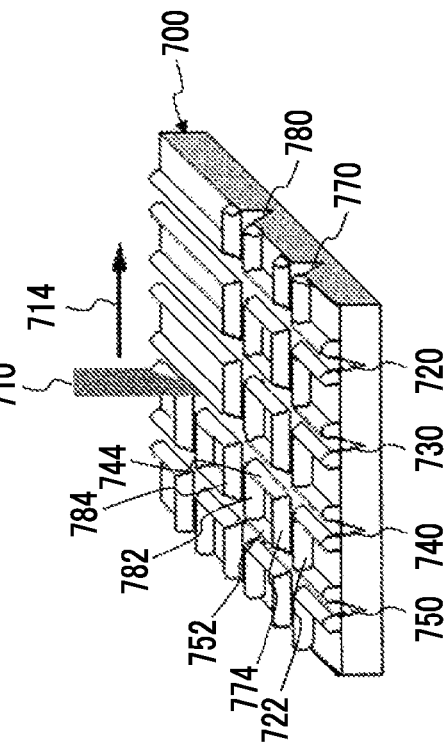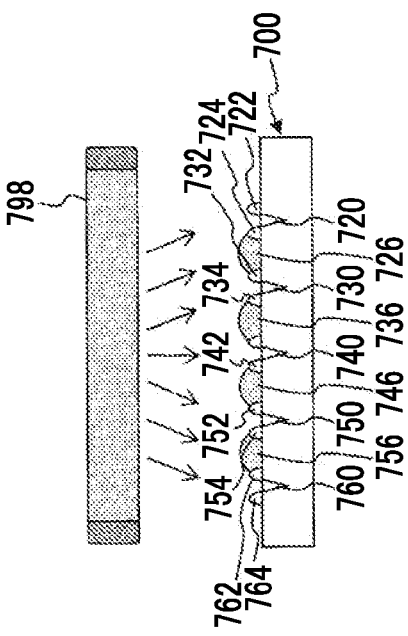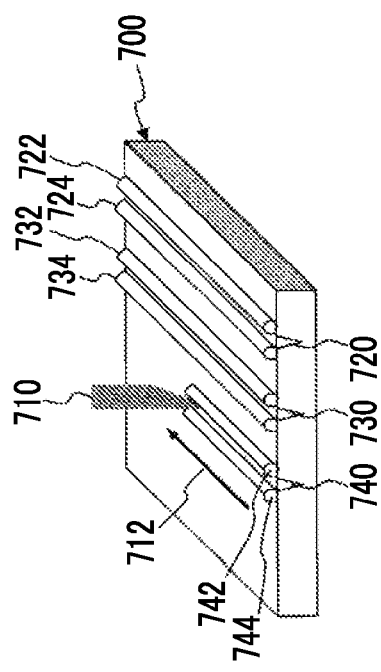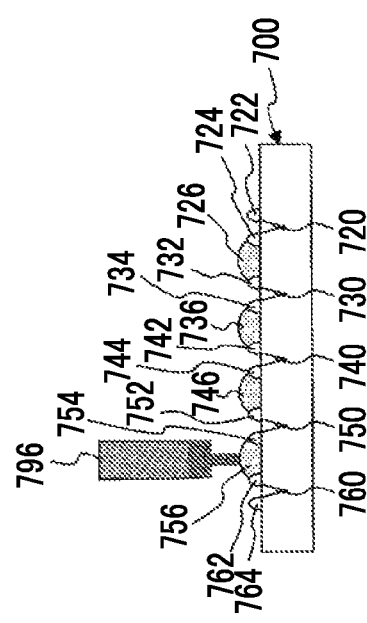
FIG. 7A
FIG. 7B
FIG. 7C
FIG. 7D

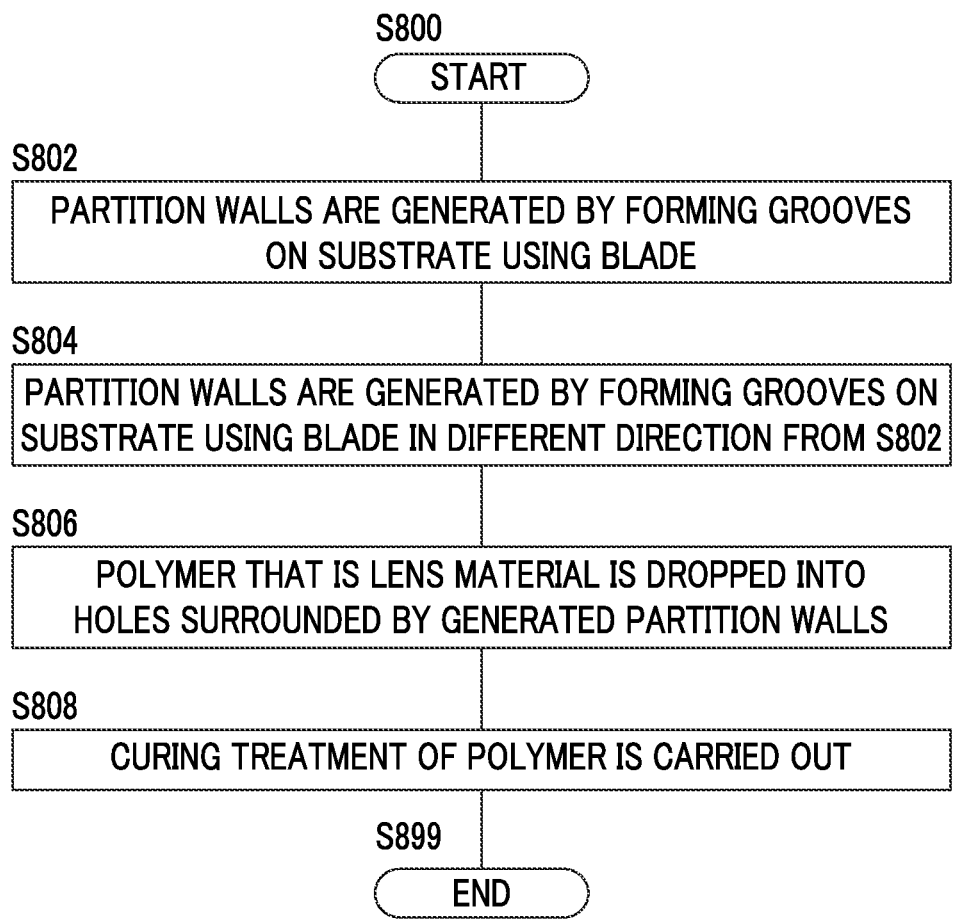

LENS ARRAY, AND METHOD FOR MANUFACTURING THE SAME

CROSS-REFERENCE TO RELATED APPLICATIONS

This application is based on and claims priority under 35 USC 119 from Japanese Patent Application No. 2013-220822 filed Oct. 24, 2013.

BACKGROUND

Technical Field

The present invention relates to a lens array, and a method for manufacturing the same.

SUMMARY

According to an aspect of the invention, there is provided a lens array, wherein partition walls are formed, using a blade, on a surface of a liquid-repellent substrate subjected to a lyophilic surface treatment, liquid-repellent groove sections formed by the blade, each of the liquid-repellent groove sections is V-shaped, lyophilic sections between the partition walls that are adjacent each other, and lenses are formed on the lyophilic sections using a liquid polymer.

BRIEF DESCRIPTION OF THE DRAWINGS

Exemplary embodiments of the present invention will be described in detail based on the following figures, wherein:

FIGS. 1A to 1E are explanatory views illustrating an example of a method for manufacturing a lens array;

FIG. 3 is a flowchart illustrating the example of the method for manufacturing a lens array;

FIGS. 7A to 7D are explanatory views illustrating an example of a method for manufacturing a lens array; and FIG. 8 is a flowchart illustrating an example of a method for manufacturing a two-dimensional lens array.

DETAILED DESCRIPTION

Figure 2:
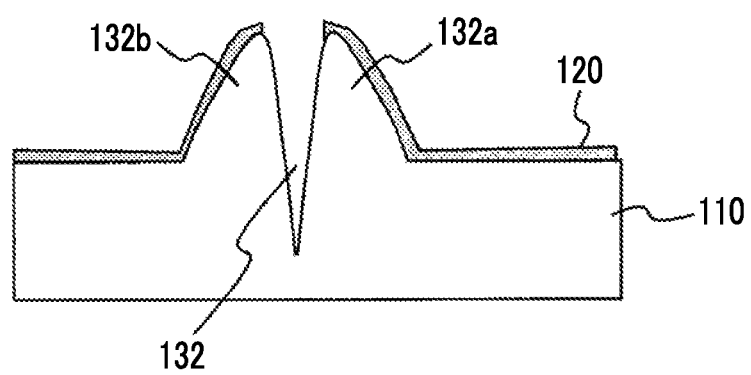
FIG. 2 is an explanatory view illustrating an example of a groove and partition walls formed using a blade.

Hereinafter, an example of an exemplary embodiment preferable for realizing the invention will be described based on the accompanying drawings.

In a lens array of the present exemplary embodiment, partition walls are formed, using a blade, on a surface of a liquid-repellent substrate subjected to a lyophilic surface treatment, liquid-repellent groove sections formed by the blade, each of the liquid-repellent groove sections is V-shaped, lyophilic sections between the partition walls that are adjacent each other, and lenses are formed on the lyophilic sections using a liquid polymer.

The lens array refers to an optical system in which plural element lenses (lens elements) forming an erect image is arrayed in parallel and a single continuous image is formed as a whole by overlapping images, and includes a lenticular lens in which half-columnar lenses are arrayed and the like. For example, it is possible to display plural images by expressing a three-dimensional image (also referred to as 3D) and by converting the line of sight (also referred to as changing). Regarding the array, there are micro-lens arrays such as an array in which lenses are arrayed in an one-dimensional manner as in examples of FIGS. 1A to 1E described below (for example, a cylindrical lens array or the like) and an array in which lenses are arrayed in a two-dimensional manner as in examples of FIGS. 7A to 7D (for example, a two-dimensional lens array such as a square lens array).

As a method for producing this lens array, there is a partition wall pinning method. In the partition wall pinning method, partition walls are formed by scratching a polymer substrate using a sharp blade, and the flow of a fluidic polymer (UV-curing polymer or the like) is suppressed by the pinning effect of the partition walls. Therefore, a lens with an intended shape may be formed by forming partition walls at a lens pitch matching the intended shape and size of the lens and ejecting or dipping a fluidic polymer toward sections between the partition walls. The curvature (focal length) of the lens is controlled using the volume of the fluidic polymer being ejected or dipped. In a method for producing a lens using the partition wall pinning method, the lens pitch, the focal distance and the lens size may be changed. In the exemplary embodiment, the partition wall pinning method is used.

An example of a method for producing a lens array of the exemplary embodiment will be described using FIGS. 1A to 1E and 3.

In Step S302, a liquid-repellent substrate 110 is produced. The liquid-repellent substrate is cut into a predetermined size, thereby producing the liquid-repellent substrate 110 made of a transparent polymer as illustrated in an example of FIG. 1A. The "liquid-repellent substrate" means that the entire substrate is repellent against the liquid polymer that becomes a material for the lens. Here, the definition of "being liquid-repellent" is that the contact angle, which is an angle formed by a droplet of the liquid polymer and the substrate, becomes greater than 90 degrees. A polymer substrate with a low surface energy is an example of the liquid-repellent substrate 110, and specific examples thereof include NEOFLON (registered trademark) ETFE (Daikin industries, Ltd.), TEFLON (registered trademark) AF grade (Du Pont-Mitsui Polychemicals Co., Ltd.) and the like that are fluorine-based polymer films.

In Step S304, a lyophilic surface treatment is carried out on the liquid-repellent substrate 110. A lyophilic surface film 120 is formed on the liquid-repellent substrate 110 as illustrated in FIG. 1B. The "lyophilic surface treatment" refers to a treatment of making the surface of the liquid-repellent substrate 110 lyophilic (highly adhesive) to the liquid polymer that becomes a material for the lens. Here, the definition of "being lyophilic" is that the contact angle, which is an angle formed by a droplet of the liquid polymer and a surface thereof, becomes equal to or less than 90 degrees.

As the surface treatment, a variety of physical and chemical treatments may be applied. For example, the surface of the liquid-repellent substrate 110 is made to be lyophilic through the application of a lyophilic liquid, corona discharging, a plasma treatment (Ar or the like), a UV (ozone) treatment (meanwhile, a fluorine-based treatment has a small effect), the use of a silane coupling agent or the like.

In Step S306, partition walls are formed on the surface of the liquid-repellent substrate 110 that has been subjected to Step S304 using a blade. Then, groove sections formed by the blade become liquid-repellent (liquid-repellent groove sections), and sections between the partition walls become lyophilic (lyophilic sections). As illustrated in an example of FIG. 1C, the surface of the liquid-repellent substrate 110 is scratched using a sharp blade 130, thereby forming the partition walls (a partition wall 132a, a partition wall 132b and the like). Here, "the partition walls being formed using a blade" means that the blade 130 is inserted into the liquid-repellent substrate 110 so as to form grooves (a groove 132 and the like), and the surface sections of the liquid-repellent substrate 110 is swollen toward both sides of the blade 130, thereby producing the partition walls (the partition wall 132a, the partition wall 132b and the like). A cross-sectional view of an explanatory region 150 illustrated in an example of FIG. 1C is illustrated in an example of FIG. 2. When the blade 130 is inserted into the liquid-repellent substrate 110 including the lyophilic surface film 120, the groove 132 is formed, and the partition wall 132a and the partition wall 132b are formed on both sides of the groove. The groove 132 section (the inner wall sides of the partition walls) becomes liquid-repellent since the inside of the liquid-repellent substrate 110 is exposed by the insertion of the blade 130. In addition, a section between the partition walls (a section between the partition wall 132a and a partition wall 134b) becomes lyophilic due to the presence of the lyophilic surface film 120. Meanwhile, the section between the partition walls is a section formed between the partition walls by the two-time insertion of the blade (or the insertion of two blades). That is, the section between the partition walls refers to a region for forming a lens that is formed between the outer wall sides (the wall surfaces that do not form the groove) of the partition walls out of four wall surfaces formed by two partition walls formed by the insertion of the blade.

Meanwhile, the liquid-repellent substrate 110 and the blade 130 may move in relation to each other (either or both of the liquid-repellent substrate 110 and the blade 130 may move). That is, the partition walls may be formed by sliding the blade 130 on the liquid-repellent substrate 110 or by moving the liquid-repellent substrate 110 with the blade 130 pressed on the liquid-repellent substrate 110 (what has been described above shall apply to the following description).

In Step S308, the polymer that is a lens material is dropped or the like into holes surrounded by the generated partition walls. As illustrated in an example of FIG. 1D, the liquid polymer (UV-curing polymer 162 or the like) is ejected or applied to the sections between the partition walls (the section between the partition wall 132a and the partition wall 134b, and the like) formed in Step S306 as illustrated in an example of FIG. 1D. Since the inner walls of the grooves are liquid-repellent, even when the liquid polymer enters, it is easy to remove the liquid polymer. For example, the liquid polymer may be removed by inclining or vibrating the liquid-repellent substrate 110, or by adding an external force through blowing. Examples of the liquid polymer include NOA65 (manufactured by Norland Products, Inc.) that is an ultraviolet radiation (UV)-curing polymer, and the like. Meanwhile, the UV-curing polymer refers to a synthetic polymer that is reacted by an ultraviolet light energy so as to chemically change from liquid to solid. In addition, the UV-curing polymer may be a hot-melted macromolecule (thermoplastic polymer).

In Step S310, a curing treatment of the polymer is carried out. That is, a lens is formed by curing the liquid polymer ejected or applied in Step S308. Specifically, when the liquid polymer is an UV-curing polymer, the liquid polymer is cured by the radiation of UV light from an UV light source 190. When a hot-melted plastic polymer is used, the liquid polymer is cured by cooling. Needless to say, the liquid polymer remains transparent in a cured state.

Next, the control of the width and curvature of the lens using the partition wall pinning method will be described using examples in FIGS. 4A to 4D, 5A and 5B. FIGS. 4A to 4D are explanatory views illustrating an example of a method for manufacturing a lens array by forming the partition walls (principle of the partition wall pinning method). Here, to simplify the description, partition walls are formed using the single blade 130, and a polymer is dropped dropwise using a single polymer-dropping apparatus 440. Needless to say, in the example, the liquid-repellent substrate 110 includes the lyophilic surface film 120.

Figure 4A:
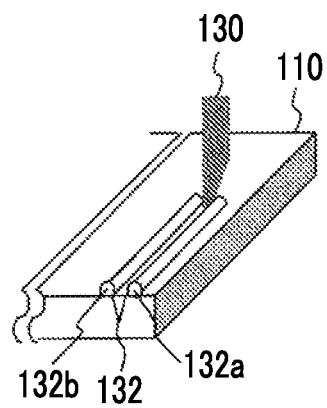
FIGS. 4A to 4D are explanatory views illustrating an example of a method for manufacturing a lens array by forming partition walls.
Figure 4B:
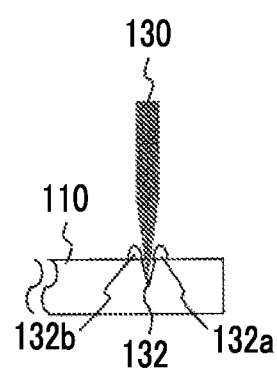

As exemplified in FIG. 4A, the groove 132 is formed by moving the blade 130 to cut the substrate (the groove 132 is cut into the liquid-repellent substrate 110), and the partition wall 132a and the partition wall 132b are formed on both ends of the groove 132. An example of FIG. 4B illustrates a cross-sectional view of the blade 130 inserted into the liquid-repellent substrate 110.

Figure 4C:
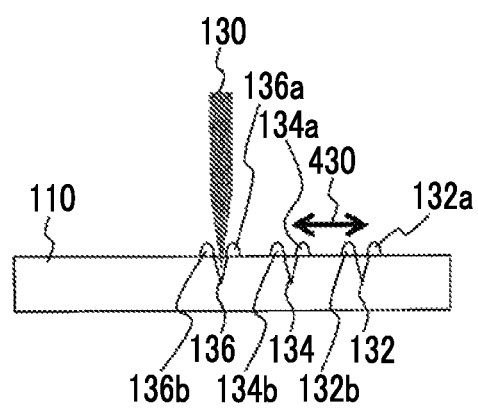

Next, as exemplified in FIG. 4C, notches (a groove 134 and a groove 136) are formed the distance of a pitch 430 away from each other by moving the blade 130, thereby forming partition walls 134a, 134b, 136a and 136b, and the like. The pitch 430 is the distance between the partition walls, and becomes the lens width. That is, the lens width is controlled by controlling the pitch 430.

Figure 4D:
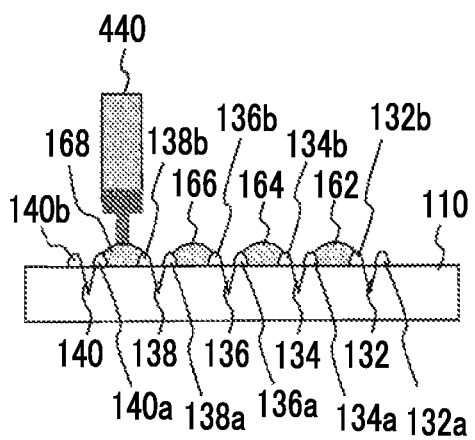

As exemplified in FIG. 4D, the UV-curing polymer (the UV-curing polymer 162 or the like) is ejected into the section between the partition walls (for example, the section between the partition wall 132b and the partition wall 134a) using the polymer-dropping apparatus 440. The curvature is controlled using the amount of the polymer ejected.

Figures 5A, 5B:
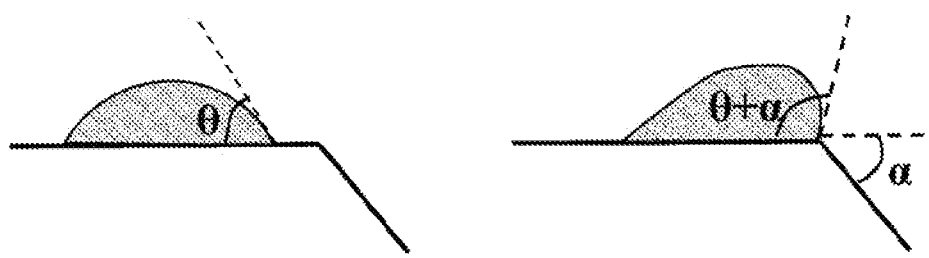
FIGS. 5A and 5B are explanatory views illustrating an example of the control of the curvature.

FIGS. 5A and 5B are explanatory views illustrating an example of the control of the curvature (the pinning effect of a curved surface). As illustrated in an example of FIG. 5A, the contact angle of a liquid interface of a liquid (the UV-curing polymer 162 or the like) present on a flat planar surface (the liquid-repellent substrate 110 including the lyophilic surface film 120) is considered as θ. When a liquid is present at a planar angle (the angular degree α of the angle formed with the plane) as illustrated in an example of FIG. 5B, it is not possible to move the liquid by the control of the pitch until "the contact angle>θ+α" is satisfied. Therefore, an arbitrary angle in a range of θ to θ+α is provided as the contact angle which is a role of a partition wall top section of the liquid-repellent substrate 110 including the lyophilic surface film 120, whereby the curvature may be controlled using the amount of the liquid droplet (for example, refer to "J. F. Oliver et al, J. Colloids and interface Sci, 59, 568 (1977)").

Figure 6:
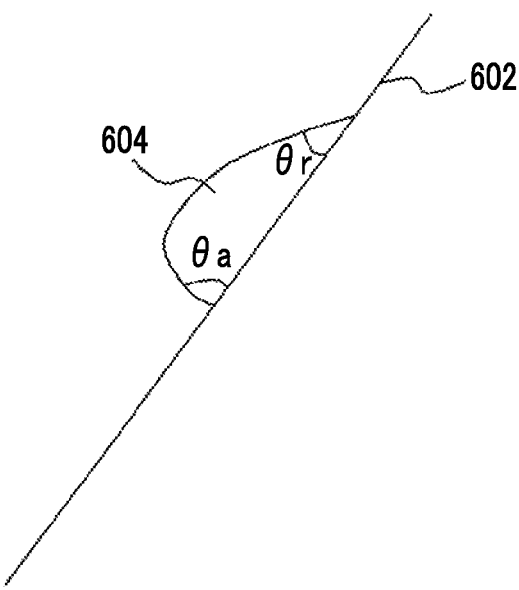
FIG. 6 is an explanatory view illustrating an example of a contact angle hysteresis.

It is desirable to form the groove as smooth as possible so that the contact angle hysteresis becomes small. The contact angle hysteresis will be described using an example of FIG. 6.

A wall 602 is either of walls forming the groove 132. A liquid droplet 604 is a polymer that is a lens material dropped into the groove 132 by mistake. The contact angle hysteresis is the difference (θa−θr) between the regressive contact angle (θr) on the upper side and the advance contact angle (θa) on the lower side of the liquid droplet 604.

The liquid-repellent substrate may not include any fine particles other than the material of the substrate to form the groove section smooth. Here, the fine particles (filler) generally refer to inorganic or organic fine particles loaded to enhance the function of the polymer in the substrate, and, in the exemplary embodiment, the liquid-repellent substrate does not include the fine particles.

In addition, in the flowchart exemplified in FIG. 3, a removal step of removing the liquid polymer ejected or applied to the groove in Step S308 may be provided after Step S308 (before Step S310). In Step S310, a lens may be formed after the liquid polymer is removed from the groove through the removal step. The substrate that is an object of the treatment may include the fine particles or may not include any fine particles other than the material of the substrate.

Next, a method for manufacturing a two-dimensional lens array using the partition wall pinning method will be described using FIGS. 7A to 7D and 8. Needless to say, a substrate 700 herein includes a lyophilic surface film. In this manufacturing method, the partition wall structure is formed in a grid shape. In the main, a method for manufacturing square lenses will be described using FIGS. 7A to 7D and 8. FIGS. 7A to 7D are explanatory views illustrating an example of a method for manufacturing a lens array. FIG. 8 is a flowchart illustrating an example of a method for manufacturing a lens array.

In Step S802, unidirectional (perpendicular direction) partition walls as illustrated in an example of FIG. 7A are formed. That is, grooves (grooves 720, 730, 740 and the like) are formed in the perpendicular direction using a blade 710 on the transparent polymer substrate 700, thereby generating partition walls (partition walls 722, 724, 732, 734, 742, 744 and the like).

In Step S804, square openings as illustrated in an example of FIG. 7B are formed. That is, partition walls are formed in a direction that is different from the direction in Step S802. Grooves (grooves 770, 780 and the like) are formed in the horizontal direction using the blade 710 on the substrate 700, thereby generating partition walls (partition walls 772, 774, 782, 784 and the like). For example, the partition walls 744, 752, 774 and 782 forms a square opening.

Meanwhile, while the partition walls are formed by moving the blade 710 in relation to the substrate 700 in Step S804, the partition walls may be formed by pressing a blade (mold) having a square opening shape onto the substrate. A groove structure may be formed through abrasion using laser light. In addition, in this case, examples of the blade shape may include a polygonal opening (for example, a rectangular shape (a quadrilateral shape having different lengths in height and width), a hexagonal shape or the like), a round opening, an oval opening and the like in addition to the square opening. Meanwhile, the shape of the lens (opening) refers to the shape of a region surrounded by the partition walls. Openings that are liquid-repellent in the groove sections and are lyophilic in the sections between the partition walls as illustrated in the example of FIG. 2 are formed through the treatments of Step S802 and Step S804.

In Step S806, a liquid polymer is ejected using a polymer-dropping apparatus 796 as illustrated in an example of FIG. 7C. The liquid polymer (polymer droplets 726, 736, 746, 756 and the like) is loaded into the regions (in this example, square) surrounded by the first partition walls (the partition walls 722, 724, 732, 734, 742, 744 and the like) and the second partition walls (the partition walls 772, 774, 782, 784 and the like) on the substrate 700. That is, the polymer 736 or the like that is a lens material is dropped into holes surrounded by the partition walls generated on the substrate 700. An array is formed of the polymer droplets 726, 736, 746, 756 and the like having a lens shape through the surface tension of the liquid polymer. Here, the liquid polymer may be an UV-curing polymer or a hot-melted thermoplastic polymer.

In Step S808, a curing treatment is carried out by the UV radiation from an UV light source 798 as illustrated in an example of FIG. 7D. That is, the curing treatment is carried out on the polymer, thereby forming individual lenses. Needless to say, the liquid polymer remains transparent in a cured state.

The above-described exemplary embodiment is a part of the exemplary embodiment of the invention. The invention is not limited thereto, and may be carried out in a variety of modified forms within the scope of the concept of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for manufacturing a lens array comprising:
    performing a lyophilic surface treatment on a liquid-repellent substrate;
    inserting a sham blade into the liquid-repellant substrate that has been subjected to the lyophilic surface treatment, thereby scratching the surface of the liquid-repellant substrate and forming grooves, wherein
    surface sections of the liquid-repellent substrate are swollen above the liquid-repellent surface and toward both sides of the sharp blade, thereby producing partition walls and planar lyophilic sections, and
    each planar lyophilic section is formed between two adjacent partition walls including walls other than walls forming the grooves;
    ejecting or applying a liquid polymer to the planar lyophilic sections; and
    forming lenses by curing the liquid polymer ejected or applied in the ejecting or applying of the liquid polymer.

2. The method for manufacturing a lens array according to claim 1, wherein when the liquid polymer ejected or applied to the planar lyophilic sections enters the liquid-repellant groove sections, the method further comprises:
    removing the liquid polymer that entered the liquid-repellent groove sections in the ejecting or applying of the liquid polymer to the planar lyophilic sections,
    wherein lenses are formed in the forming of the lenses after the liquid polymer is removed from the liquid-repellent groove sections in the removing of the liquid polymer.

3. The method for manufacturing a lens array according to claim 1, wherein the substrate does not include any fine particles other than a material of the substrate.

4. The method for manufacturing a lens array according to claim 2, wherein
the substrate does not include any fine particles other than a material of the substrate.

5. The method for manufacturing a lens array according to claim 1, wherein
the liquid polymer is an ultraviolet-curing polymer or a hot-melted thermoplastic polymer.

* * * * *